United States Patent [19]

Brouwer

[11] 4,371,782
[45] Feb. 1, 1983

[54] OPTICAL PATTERN TRACING SYSTEM WITH REMOTELY CONTROLLED KERF AND FORWARD OFFSETS

[76] Inventor: Frans Brouwer, 410 Greenwood Ave., Glencoe, Ill. 60022

[21] Appl. No.: 108,549

[22] Filed: Dec. 31, 1979

[51] Int. Cl.³ ............................................... G05B 1/00
[52] U.S. Cl. .................................... 250/202; 318/577
[58] Field of Search ............... 250/202, 236; 318/577; 350/6.6

[56] References Cited

U.S. PATENT DOCUMENTS

| | | |
|---|---|---|
| 3,004,166 | 10/1961 | Greene ............................... 250/202 |
| 3,017,552 | 1/1962 | Brouwer ........................... 250/202 |
| 3,037,888 | 6/1962 | Lobosco et al. ................... 250/202 |
| 3,094,624 | 6/1963 | Wills ................................. 250/202 |
| 3,366,857 | 1/1968 | Jewell et al. . |
| 3,386,786 | 6/1968 | Kaisler et al. . |
| 3,479,513 | 11/1969 | Simpson et al. . |
| 3,544,221 | 12/1970 | Putnam . |
| 3,624,574 | 11/1971 | Montagu . |
| 3,704,373 | 11/1972 | Bardwell et al. . |
| 3,711,717 | 1/1973 | Rich et al. . |
| 3,717,332 | 2/1973 | Luker et al. . |
| 3,725,761 | 4/1973 | Webber . |
| 3,727,120 | 4/1973 | Jewell et al. . |
| 3,767,923 | 10/1973 | Bardwell . |
| 3,812,412 | 5/1974 | Hahn et al. . |
| 3,860,862 | 1/1975 | Dell et al. . |
| 3,883,735 | 5/1975 | Murphy et al. . |
| 3,902,783 | 9/1975 | Bodlaj . |
| 3,920,316 | 11/1975 | Daguillon . |
| 3,932,743 | 1/1976 | Sitnichenko et al. . |
| 3,946,166 | 3/1976 | Wossidlo . |
| 3,959,673 | 5/1976 | Montagu . |
| 3,995,154 | 11/1976 | Schlick et al. . |
| 4,002,900 | 1/1977 | Sitnichenko et al. . |
| 4,011,003 | 3/1977 | Dragt . |
| 4,021,096 | 3/1977 | Dragt . |
| 4,039,246 | 8/1977 | Voigt . |
| 4,049,962 | 9/1977 | Kallen . |
| 4,063,287 | 12/1977 | van Rosmalen . |
| 4,081,671 | 3/1978 | Bohme et al. . |
| 4,090,112 | 5/1978 | Selverstone . |
| 4,100,576 | 7/1978 | Ditthardt . |
| 4,123,146 | 10/1978 | Dragt . |
| 4,128,297 | 12/1978 | Bourne . |
| 4,128,481 | 12/1978 | Schreyer . |
| 4,129,814 | 12/1978 | Francke . |
| 4,135,119 | 1/1979 | Brosens . |
| 4,160,199 | 7/1977 | Bardwell . |
| 4,238,673 | 12/1980 | Layden ............................ 250/202 |

Primary Examiner—David C. Nelms
Assistant Examiner—Edward P. Westin

[57] ABSTRACT

An optical scanner for a pattern tracing system for scanning an irregular two-dimensional pattern using an optical beam deflection principle. A scanning head is non-rotatably mounted above the pattern on a frame moveable in two coordinate directions. The scanning head reflects an image onto the pattern by a pivotally mounted mirror in the scanning head and is deflected at high frequency in two normally orthogonal planes by the interaction of a pair of perpendicularly related electromagnets with a permanent magnet. The geometric axis of the mirror nutates around a scan axis to provide a generally circular scan image on the pattern. The axis about which the mirror nutates, referred to as the scan axis, is shiftable from a fixed reference axis to achieve offsets for the scan image to provide both forward offset and "kerf" offset perpendicular to the forward offset. A control circuit derives out of phase alternating signals for the two scanner coils to cause this nutational motion of the mirror. The offset of the axis of nutation from the reference axis is effected by the application of direct current signals to these coils.

24 Claims, 12 Drawing Figures

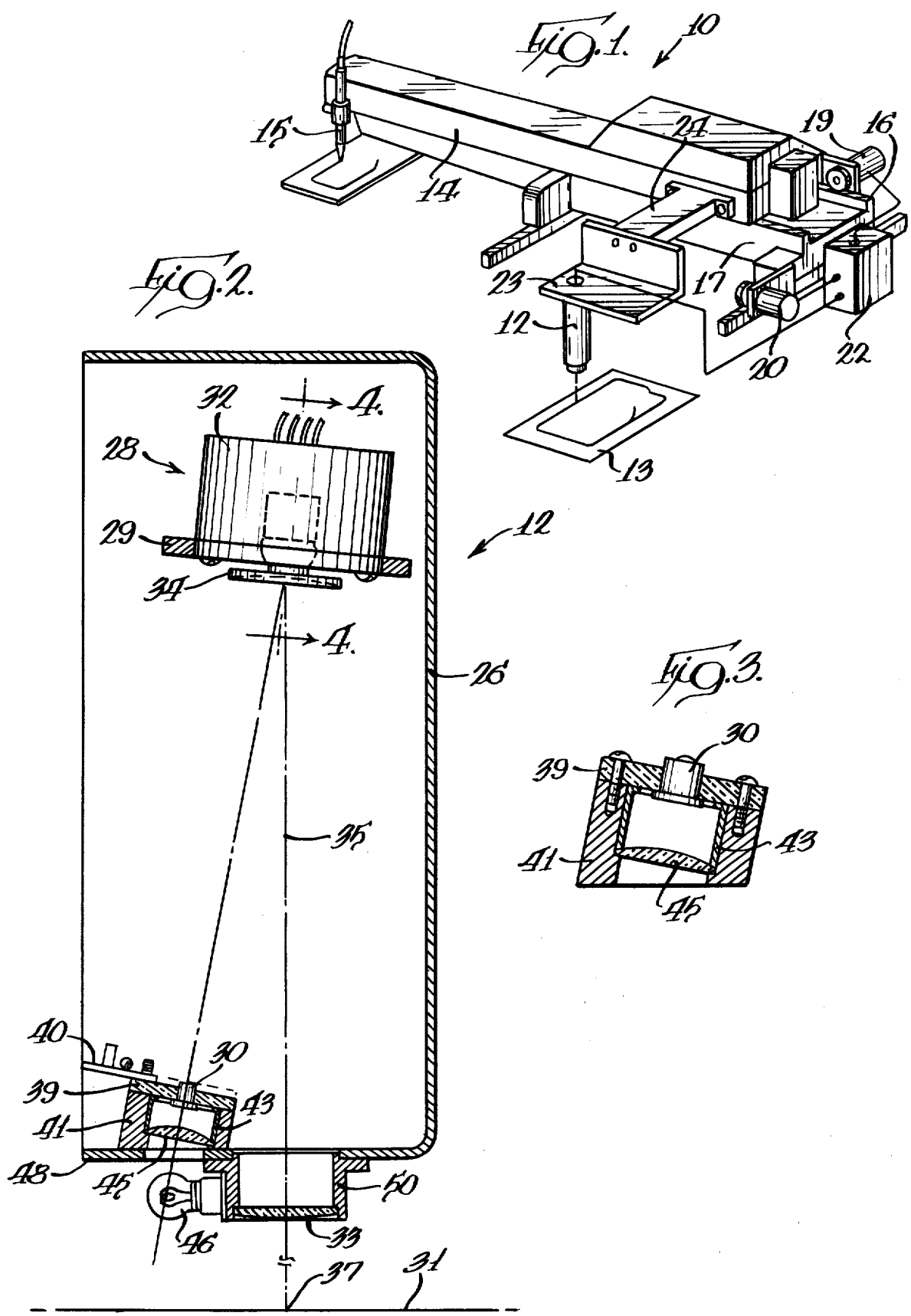

OPTICAL PATTERN TRACING SYSTEM WITH REMOTELY CONTROLLED KERF AND FORWARD OFFSETS

BACKGROUND OF THE PRESENT INVENTION

In conventional pattern tracing systems of the optical type, a scanner mirror forms a part of an optical system which normally projects an image of a photocell onto a line or an edge that is part of the pattern to be traced. When the scanned image of the photocell traverses the pattern, signals are obtained from the photocell which are used to derive directional and displacement signals which in turn are used to derive signals for x and y coordinate servo-systems that maintain the optical scanning system positioned properly above the pattern while driving it along the pattern at a preselected speed.

The feed speed signals for the tracing head are generally set to a predetermined value on a control panel, which value when multiplied by the sine and cosine of the angle that the pattern makes with a reference direction form individual coordinate feed signals which are usually directly added into the servo input signals. Sine and consine signals are derived from the optical scanning information, either with electromechanical syncro resolvers in the tracing head or with electronic sine/cosine resolving circuits, and these signals are fed to the respective servo-motors to control servo-motor speed along each coordinate to that the tracing head follows the pattern to be traced.

Optical pattern tracers of this type are widely used in the industry to guide machine tools such as flame cutting machines or milling machines along a path identical to a flat or two-dimensional pattern. Examples of these systems are illustrated in the Barry et al U.S. Pat. Nos. 2,499,178, the Brouwer 3,017,552 and the Jewel 3,322,952.

In most of these systems, the tracing head or a scanning element in the tracing head is pivotally mounted and has a steering servo which pivots the scanning element about a reference axis approximately perpendicular to the pattern segment being scanned. Many of these systems mount the scanner on an arm the radius of which may be manually adjusted. This arm is maintained perpendicular to the pattern by the servo-motor and it compensates for errors caused by the radius of the cutting tool. This is sometimes referred to as "kerf offset" and is equal to the effective tool radius or half the width of the flame that cuts the path in a flame cutting tool. This method is effective and works well as long as the steering servo has a sufficiently fast response to cope with the required rate of rotation when the machine moves around the corners of the pattern.

These systems have the primary disadvantage that the cost of the steering servo and the mechanical pivot assembly associated therewith for the scanning element significantly add to the cost of the tracing system. The steering servo systems have the additional disadvantage of requiring the forward and kerf offsets to be primarily mechanical manipulative adjustments. The steering servo may be eliminated but by so doing the tool radius compensation feature, or "kerf offset" is manually also eliminated, and systems representing this type are disclosed in the Parker et al U.S. Pat. No. 3,704,372 and the Hannappel et al U.S. Pat. No. 3,534,162. The Hannappel et al system, for example, includes an annular array of fixed photosensitive elements which are electronically sequentially scanned. However, this system has no compensation for the full tool radius.

In addition to not providing full tool radius compensation, the systems that eliminate the steering servo for the scanner, also have very limited control over the forward offset of the scan circle. The forward offset is generally required for control stability at higher speeds, since the effects of mechanical inertia of the parts increase geometrically with the speed of the scanner frame and the moving parts carried thereby. In prior scanning systems which do not have the steering servo for the scanning head, the forward offset is effectively equal to the scanning circle radius which cannot easily be changed or varied. Therefore, since a larger forward offset is generally needed for control stability at higher speeds, these systems usually compromise by using a forward offset, or scanning circle radius, much larger than needed at slower machine speeds. This sacrifices low speed accuracy and consequently larger geometric errors are caused than desired at lower speeds by such tracing systems.

Still other tracing systems employ a continuously rotating scanner motor instead of a steering servo, and in these a reference point is defined by the intersection of the axis of rotation of the scanning motor with the pattern. In this system the optical axis of a photocell intersects the pattern a distance away from the reference point and describes a circle around the reference point. A photocell signal is obtained when this scanning circle intersects the pattern which occurs twice per revolution, although only the forward intersection point is normally employed to develop control signals. The forward offset is equal to the radius of the scanning circle since the photocell looks at a pattern point separated by distance R from the reference point. In such a system R, or the forward offset, can only be changed mechanically such as by using a set of mirrors having a different tilt selectively mounted by the operator on the scanning motor shaft. This is an extremely cumbersome system and very difficult for the operator to manipulate with any degree of efficiency.

The side offset, or kerf compensation, is even more difficult and limited in systems having the continuous rotary scanner motor-mirror. Since the direction of the pattern is measured by the phase of the photocell pattern crossing-time relative to the motor driving sine wave, by adding or subtracting an additional or fixed phase shift, the crossing point we look at is not necessarily in the forward direction but may be at an angle away from the forward offset direction. In these systems, the kerf offset cannot be even as large as the radius R of the scan circle, since forward offset would be zero (if kerf offset equals the radius of scan) and in this case the directional sense of the system is lost.

Since a larger forward offset is needed at higher speeds, and a lower forward offset is desirable at lower speeds, even the most flexible of these prior systems requires the operator to shut down the tracer and mechanically adjust the forward offset by one of a variety of methods described above when changing the tracing speed.

SUMMARY OF THE PRESENT INVENTION

In accordance with the present invention, an optical pattern tracer is provided having a non-rotatable scanning head with an optical beam deflector that projects a generally circular image area on the pattern to be traced wherein the beam deflector shifts the circular image area from a reference axis to achieve both forward offset and kerf offset without requiring any manual or mechanical manipulation of any tracing head parts. This system eliminates the need for a steering servo for the tracing head and permits both kerf offset and forward offset to be effected from a remotely located control station.

Toward this end, the optical beam deflector consists of a pivotally mounted flat or curved mirror that is deflected in two normally orthogonal planes by the interaction of a pair of perpendicularly related electromagnets with a permanent magnet, with one of these elements being stationary and the other carried by the deflectable mirror. The mirror is supported for movement in any direction by a diaphragm fixed within the scanner that returns the mirror to a reference position when undeflected. The diaphragm, electromagnets and permanent magnet combination compels the mirror to describe a nutational motion around a predetermined scanning axis that forms the generally circular image area on the pattern.

As the mirror nutates about its scanning axis, it projects the image onto the pattern to be traced, which may include either a line or edge type pattern. The nutational motion of the mirror produces a generally circular or annular image as it traverses the pattern.

The nutational motion of the mirror is effected by a scanner control that applies out of phase alternating signals to the electromagnetic coils that drive the mirror. By applying equal amplitude signals to both of the coils, ninety degrees out of phase, the nutational motion of the mirror provides a circular image on the pattern, and by applying a greater amplitude signal to one of the coils than the other, the nutational motion of the mirror will produce an eliptical image on the pattern, which is desirable under certain control conditions.

As the image of the photocell traverses the line or edge, control signals are obtained that are used to derive directional and displacement information from a sine/cosine electronic resolver. The resolver provides the drive signals for x and y coordinate servo-systems that maintain the optical scanning system properly positioned above the pattern while driving it along at a selected speed.

An important aspect of the present system, is its ability to provide forward offset and kerf offset, without significant limitation as to value, both positively or negatively, by displacing the entire generally circular scan area by a predetermined amount without varying the configuration of the scan image in any way. As noted above, an offset perpendicular to the pattern outline is used to compensate for errors caused by the finite dimensions of the cutting tool and is referred to as "kerf offset" KO. And an offset in the direction of motion is used to stabilize servo performance and compensates for errors caused by the inertia of the mechanical parts and is referred to as forward offset, FO. In accordance with the present invention, these offsets are obtained completely electronically by shifting the nutational axis of the optical deflecting mirror.

Toward this end, the scanner control circuit includes pulse width modulators which modulate the drive signals from the sine/cosine electronic resolver and apply them as slowly varying d.c. signals to summing inputs to the two perpendicular electromagnetic coils driving the scanner head mirror. The d.c. signals deflect the nutational axis of the mirror both in the direction of motion of the scanning head, or more properly the direction of the line or edge traced, to achieve forward offset, and also deflect the nutational axis in a direction perpendicular to the pattern to be traced to achieve kerf offset both without varying the scan radius R. Using this system, the forward offset FO may be quite large for high speed tracing while at the same time maintaining the same scanning radius.

An even greater benefit from this scanning system, results from its ability to shift the nutational axis rearwardly in a direction opposite the motion of the tracing head, from the reference axis, so that the effective forward offset may be less than the scan radius at any fraction thereof desired. This smaller effective forward offset at low speed accomplishes more precise cornering.

Another important feature of the present tracing system, is the automatic variation in effective forward offset as the tracing speed is varied. Toward this end, one of the pulse width modulators, described above for modulating the sine/cosine drive signals, provides variable speed drive signals, to the x and y servo-motors to vary the speed of the tracing head, and also delivers the same signals to the scanner coils that control the forward offset of the nutational axis of the scanner mirror. In this way as scanning speed increases the forward offset increases in a proportional fashion, although the proportional relation may be varied as desired.

Another feature of the present invention is the provision of a spot finder that surrounds the discrete scanned image and it forms an annular brightly lighted spot on the area of the pattern surrounding the geometric axis of the scanning mirror to identify the scan area to the operator. Because the annular lighted spot surrounds the geometric axis of the scanning mirror, as the mirror nutates the scanned area is identified to the operator by an annular light ring regardless of the forward or side offsets of the image from the reference axis.

Toward this end, the photocell in the optical scanner is mounted in a clear plastic holder and a lamp is mounted beneath the holder with a condensing lens directing light from the lamp around the photocell onto the mirror. The mirror reflects this light onto the pattern providing an annular lighted area on the pattern when the mirror is not nutating and a larger annular lighted area around the nutational axis of the mirror when the mirror is nutating. This same lamp is also positioned in the tracing head so that it provides the additional function of illuminating the pattern.

A still further advantage in the present optical deflection system is that it eliminates the dependency of the forward and side offsets on the height variations of the scanning head above the pattern, within the depth of focus range.

With the present optical tracing system, scanning speeds are obtainable significantly faster than possible with scanning systems using motorized steering servos even though the costly motor drive assembly is eliminated.

BRIEF DESCRIPTION OF THE DRAWINGS

FIG. 1 is a perspective view of an optical pattern tracing system according to the present invention positioning a flame cutting tool;

FIG. 2 is an enlarged view, partly in section, showing the tracing head subassembly illustrated in FIG. 1;

FIG. 3 is an enlarged fragmentary view of the photocell assembly illustrated in FIG. 2;

DETAILED DESCRIPTION OF THE PREFERRED EMBODIMENTS

Figure 4:
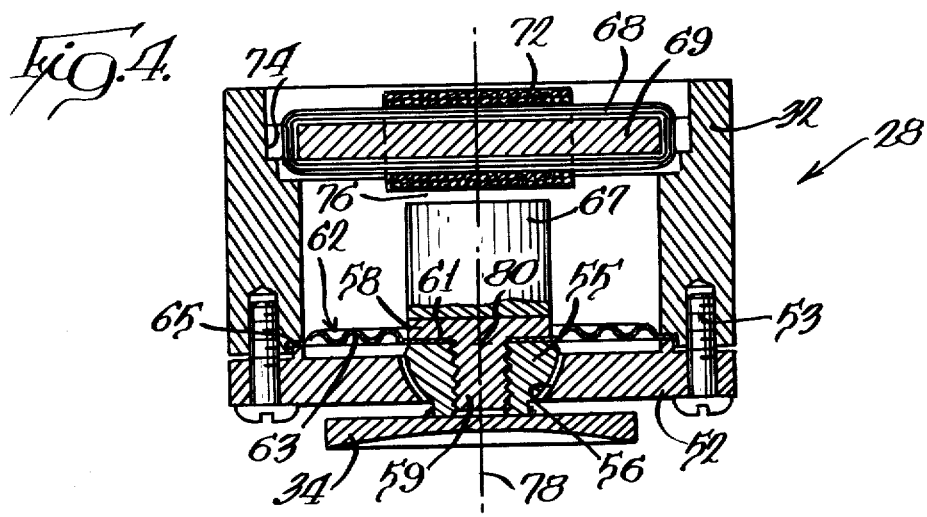
FIG. 4 is a cross-section through the optical scanner illustrated in FIG. 2 taken generally along line 4—4.

Referring to the drawings and particularly FIG. 1, a flame cutting machine 10 is illustrated having a tracing head 12 that follows a pattern 13 and provides control signals for shifting a machine slide 14 about two axes controlling the position of a flame cutting tool 15. The slide 14 is reciprocably mounted on ways 16 carried by a transversely reciprocable slide 17, to provide two axes motion for the tracing head 12 and the flame cutting tool 15. Slide 14 is driven by servo-motor 19 and slide 17 is driven by servo-motor 20 from a control console 22 that is provided with control signals by the tracing head 12.

With the exception of the tracing head 12, the general description of the flame cutting machine 10 above is conventional, and it should be understood that the present tracing system can be used to control the movement of other tools besides flame cutting tools.

The tracing head 12 is non-rotatably mounted on a bracket 23 above pattern 13 that is carried by slide 14 from an arm member . 24 fixed to the slide 14.

As seen in FIG. 2, the tracing head 12 includes a generally rectangular housing member 26 that is non-rotatably fixed to frame 23. An optical scanner 28 is mounted in housing 26 on an angularly positioned support frame 29 and serves to direct the image of a photocell 30 onto a pattern 31 through a lens 33. The scanner 28 includes an annular housing 32 carried by frame member 29 and a mirror 34 mounted for pivotal movement about two orthogonal axes. The mirror 34 is concave although it may be desirable under certain conditions for it to have a flat rather than concave reflecting surface. The mirror 34 is angularly positioned along with the frame member 29 such that when at rest, it projects the image of photocell 30 on an axis coincident with a reference 35 which is the geometric axis of lens 33 onto a reference point 37 on the pattern.

A spot finder is provided to assist the operator in easily locating the area on the pattern being scanned. Toward this end, the photocell 30 is supported in a clear plastic plexiglass holder 39 angularly supported in housing 26 by an annular frusto-cylinder 41. A printed circuit board 40 is mounted on holder 39 for processing control signals from photocell 30. The annular support 41 has a cylindrical diaphragm 43 and a condenser lens 45 mounted therein that projects light from a flood lamp 46 to the mirror 34 around the photocell 30. To obtain maximum light intensity, the lens 45 is a condenser lens that focuses the filament of lamp 46 on the mirror 34. The diaphragm 43 with the photocell 30 outline and define a ring of light which is projected by mirror 34 around the axis of the mirror 34 regardless of its position and therefore it is always concentric with the scanned spot. The flood lamp 46 is fixed to the housing 26 and is positioned below lower portion 48 of the housing so that it illuminates the pattern 31. The intensity of the ring of light reflected from the flood lamp 46 by the mirror 34 onto the pattern is quite a bit higher than the light that reaches the pattern 31 directly from the flood lamp 46 so that it is very clearly visible to the operator.

The geometric or optical axis of the mirror 34 nutates about an axis during scanning and when it does so the ring of light projected from the flood lamp 46 by the mirror 34 onto the pattern scribes an annular or circular high intensity light area that enables the operator to locate the scanned area regardless of the offset of the nutational axis of mirror 34 with respect to the fixed reference axis 35.

This annular ring of light or spot finder may also effectively be used for the focusing-height adjustment of the tracer head above the pattern. In order to prevent interference by surface reflection from the lens 33, the lens is mounted with a few degrees of tilt so that the light reflected from the surface of lens 33 cannot return or be reflected by mirror 34 to the photocell 30. This does not materially affect the major purposes of lens 33.

The lens 33 is mounted in a lens holder 50 fixed to the lower housing member 48 of the tracing head and it has a long focal length that does not significantly contribute to the focusing of the optical system. It performs two important functions. Firstly, it serves as a window to close the tracer housing 26 against the entry of dust, and secondly, and more importantly, it makes the tracer head or the scanner offset independent of scanning head height variations within the depths of focus range of the optical system. The focal plane of lens 33 contains the center of mirror 34 by the appropriate selection of the focal distance of the lens. Therefore, regardless of the condition of tilt of the mirror 34, any light ray through its center which is the focal point of lens 33 corresponds to a ray below lens 33 that is parallel to the optical axis 35 (also referred to as the reference axis above). For this reason small height variations of the tracing head to pattern distance do not influence the magnitude of the offsets of the axis of mirror 34 from axis 35, as it would in systems where the projected beam intersects the pattern at an angle other than ninety degrees.

In an alternative form (not shown in the drawings) of the photocell, lens and flood lamp combination, the locations of flood lamp 46 and photocell 30 are reversed so that a high intensity light spot moves over the pattern around the vicinity of point 37 just as the image of the photocell does in FIG. 2 embodiment described above. In this case, the photocell receives light variations depending on the varying reflectivity of the pattern in the area scanned by the light spot. The separate spot finder is then superfluous since the scanning spot fills that purpose. This system will work quite well in the absence of extraneous light disturbance such as flicker light from room lamps and particularly in the absence of florescent lamps which are more difficult to eliminate.

Figure 5:
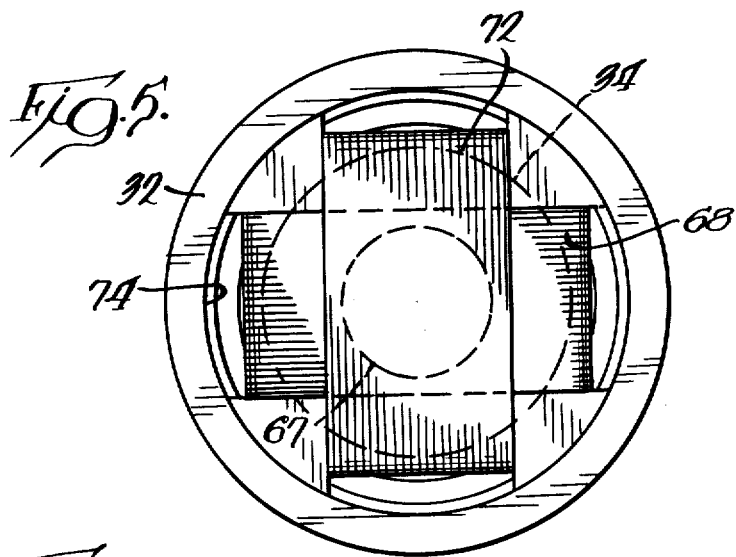
FIG. 5 is a top view of the scanner illustrated in FIG. 4.

As seen in FIGS. 4 and 5, the scanner 28, illustrated as an enlarged subassembly in these Figs., includes the housing member 32 which is of annular configuration having a cover plate 52 fixed at a lower end thereof by threaded fasteners 53. The mirror 34 is fixed to a semispherically shaped boss 55 that extends through a semispherically shaped opening 56 disposed centrally in cover plate 52 with a large clearance in the opening. A flat-headed fastening element 58 has a projection 59 threadably received in the spherical member 55 and clamping a central portion 61 of an annular spring metal diaphragm 62 to the spherical member 55.

Diaphragm 62 functions to support mirror 34 for pivotal movement about any axis and returns the mirror when undeflected to a position where the axis of the mirror is coincident with the reference axis. The diaphragm 62 has a plurality of annular bellow curves 63 that provide it with the necessary rigidity and flexibility. The outer periphery 65 of the diaphragm 62 is clamped between the lower end of housing member 32 and the cover 52. A permanent magnet 67 is bonded to the head of member 58 and it therefore pivots with mirror 34.

The permanent magnet 67 is pivoted in orthogonal planes by a first electromagnetic stationary coil 68 wound about a core member 69 and a perpendicularly related electromagnetic coil 72 wound around coil 68. The coil members 68 and 72 are seated in a suitable potting material (not shown) in turn seated in a stepped counterbore 74 in the upper end of housing 32.

The cover 52, spherical member 55, fastener 58 and annular housing 32 are made of a soft magnetic steel to obtain a low value of remnant magnetism in these parts. The magnetic lines of force emanating from the bottom of the magnet pass through pin 58, spherical member 55, cover 52 and annular housing member 32 in sequence to return to the top side of the magnet. The air gaps between the parts are small and the magnetic reluctance of these gaps is not significant compared to the reluctance of the gap between the upper end of the magnet and core plate 69. The magnet 67 is dimensioned to maintain a strong field in gap 76 and it is constructed of a samarium-cobalt alloy which has a high energy product. The gap 76 between magnet 67 and core plate 69 is partly filled with the wires of coils 68 and 72.

Figure 9:
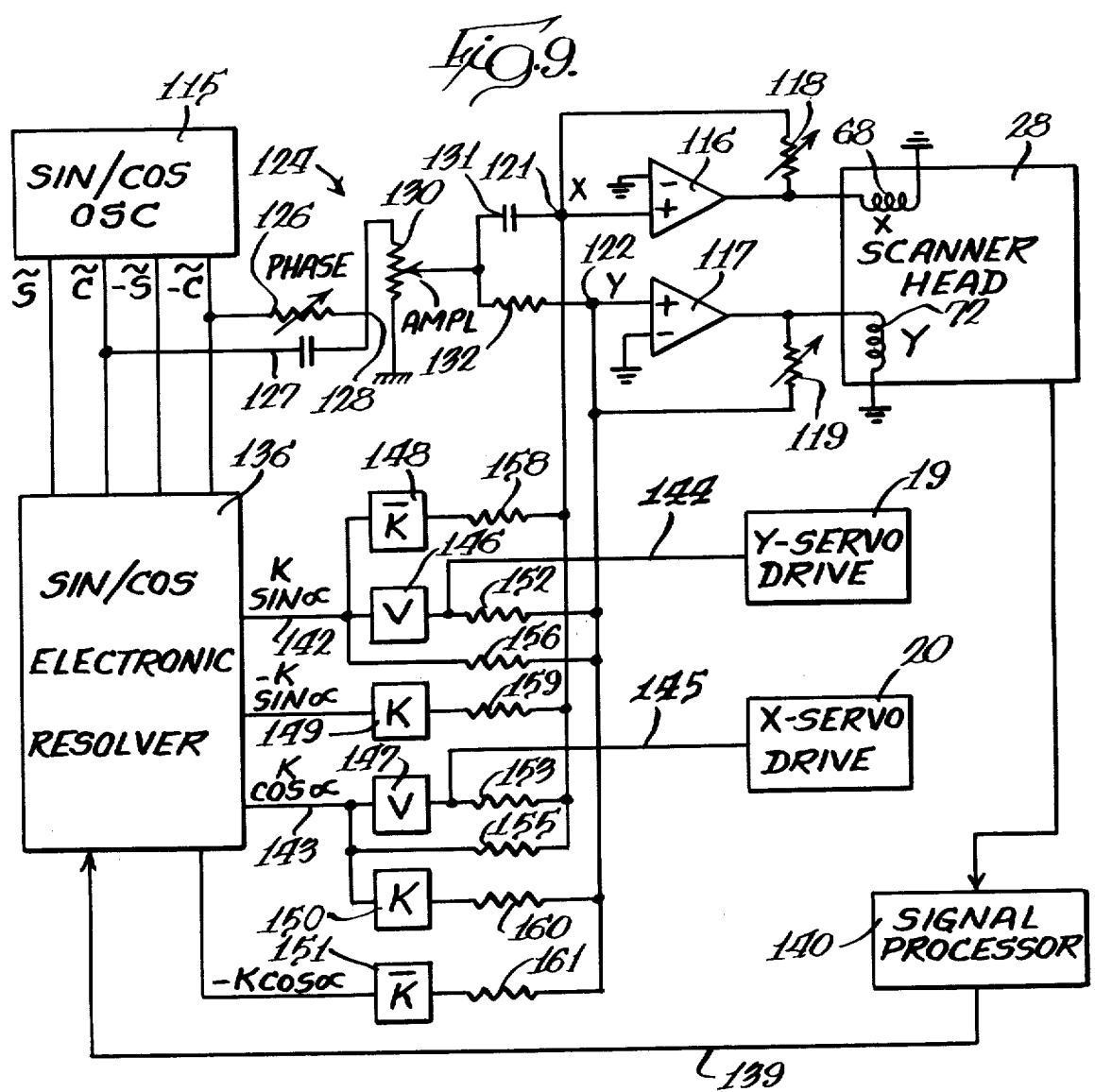
FIG. 9 is a partly schematic control circuit for the scanner and the x and y servo-motors for the tracing head.
Figure 11:
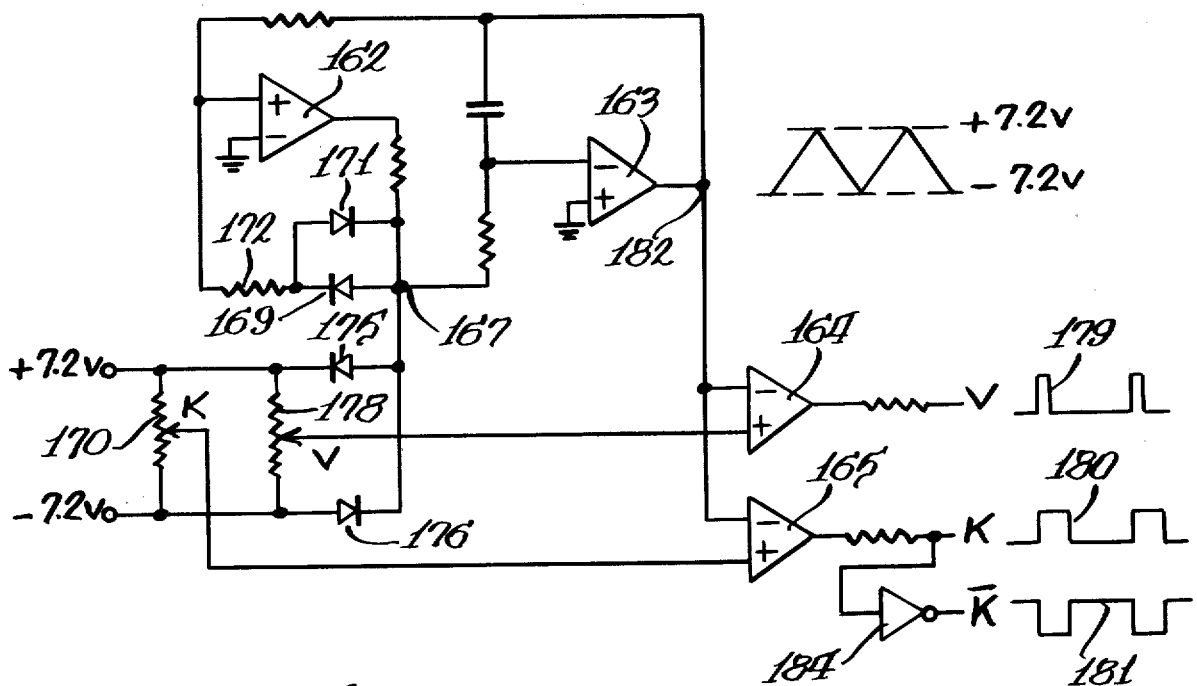
FIG. 11 is a schematic circuit illustrating a pulse width modulator for deriving the kerf and forward offset and speed signals.

A scanner drive circuit provides a direct current signal in coil 72 that produces a side force on the magnet 67 causing the axis of mirror 34 to tilt away from the reference axis 35 within the plane of the FIG. 4. A direct current in coil 68 similarly moves the magnet 67 and the axis of mirror 34 away from axis 35 at right angles to the plane of FIG. 4. The present control circuit illustrated in FIGS. 9 and 11 provides a combination of these direct current signals to coils 68 and 72 to provide the forward and side offsets of the mirror axis 78 with respect to the reference axis 35. The offset axis provided by these direct current signals from the reference axis 35 defines a nutational axis about which the mirror 34 oscillates during scanning.

The nutational movement of the mirror 34 projects a generally annular scan image on the pattern 31 and is effected by providing alternating current signals in out of phase relation to the coils 68 and 72. An alternating current signal in either coil 68 or 72 causes vibration of the mirror 34 and magnet 67 around the static axis of the mirror 34 whether displaced from the reference axis 35 by the direct current offset signals or not. The control circuit simultaneously applies equal amplitude alternating current signals of ninety degrees phase difference to coils 68 and 72, and this causes the mirror axis 78 to scribe a cone of which the top is approximately coincident with center 80 and the resulting image of the photocell 30 on pattern 31 is annular in shape. The control circuit selectively provides unequal amplitude signals or less than a ninety degree phase shift between these drive signals, and this causes the mirror 34 to define a cone projecting an eliptical image on the pattern 31.

According to the present invention, the control circuit simultaneously applies these out of phase alternating signals and the direct current signals to coils 68 and 72 to cause the mirror axis 78 to describe a cone around an axis which is displaced in any desired direction away from the reference axis 35, within the limits of freedom of motion compelled by the configuration of housing 26. In this manner, a scanning circle or area is provided that has a radius R totally independent of the offset of the center of the scanning circle.

The scanning circle is established by feeding $R \cos wt$ and $R \sin wt$ signals to the coils 68 and 72. The control circuit adds to these alternating current signals, signals equal to $(pV+q) \cos \alpha - rK \sin \alpha$ and $(pV+q) \sin \alpha + rK \cos \alpha$ representing the slowly varying d.c. signals providing the forward and side offsets. The term V is the operator selected speed signal and K is the operator selected side offset signal (r, p & q are constants and R is the radius of the scan circle.) The effective forward offset in this equation is $FO = pV + q + R$ and the side offset is $KO = rK$. Note that the $rK$ terms are at right angles to the $pV+q$ terms and result in offsets perpendicular to motion.

It is seen from this equation that the forward offset $FO = pV + q + R$ is proportional to the value of the speed signal V, and therefore the forward offset varies automatically with the tracing speed selected.

By selecting a negative value for q the offset of the center of the scanning circle may be negative (or rearwardly from the direction of motion of the tracing head) from the reference point 37 defined by reference axis 35 shown in FIG. 2. This provides an effective forward offset, useable for low speed tracing, which is less than the radius R of the scan circle to accomplish more precise slow speed cornering.

The control circuit also provides either a positive K or negative K signal to offset the nutational axis of the mirror 34 perpendicular to the direction of motion on either side of the reference point to effect either positive or negative kerf selection.

It is desirable that the scanner 28 have a high natural frequency. In tracing systems, it is desirable to use scanners of relatively high natural frequency, well above the response rates of the typical servo-mechanisms. This can best be accomplished by a mirror of the smallest practical dimension of the lightest available material, mounted as close as possible to the center 80. It may also be shown by analysis that the highest natural frequency may be obtained for a given electrical power input when a magnet is used of an inertia of similar magnitude as the mirror inertia. Diaphragms of increasing stiffness raise the resonant frequency but require increasing d.c. power for given deflection. In the FIGS. 4 and 5 embodiment, a deflection constant of 0.01 rad $W^{-\frac{1}{2}}$ resulted in a resonant frequency in excess of 100 Hz, using a SaCo magnet with an energy product of 16,000,000 Gauss-Oersted. Critical damping is obtained by filling the cavity of housing 32 with a damping oil.

Figure 6:
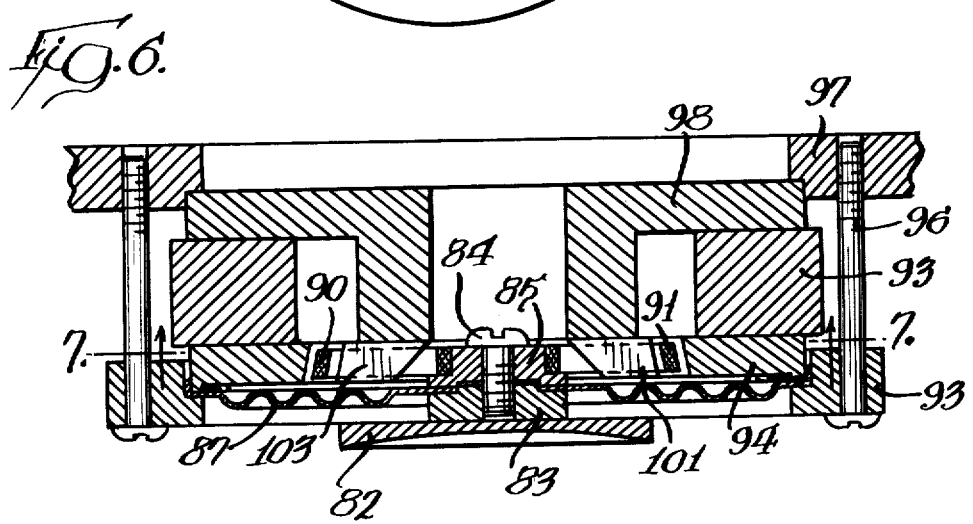
FIG. 6 is a cross-section of another embodiment of the optical scanner illustrated in FIGS. 4 and 5.
Figure 7:
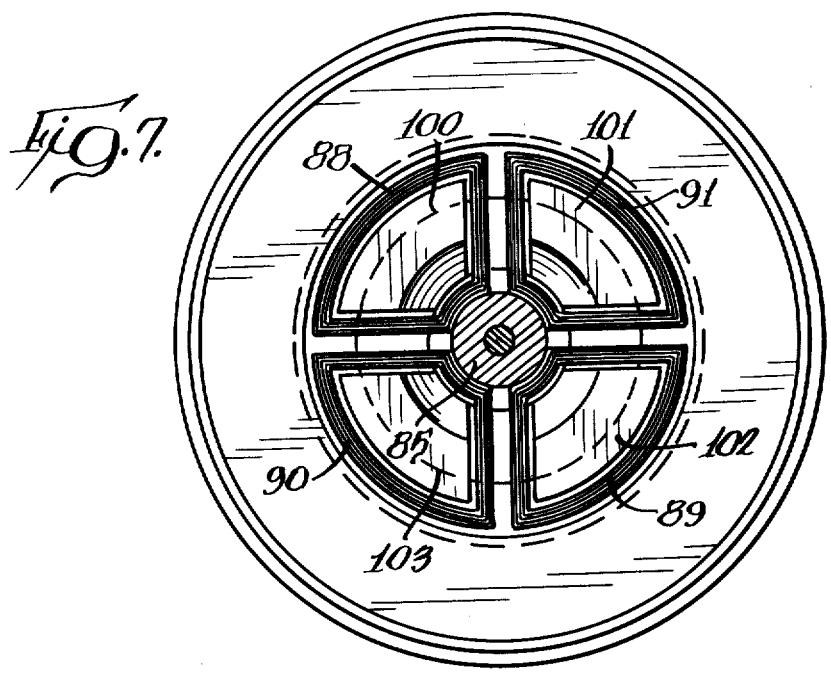
FIG. 7 is a cross-section taken generally along line 7—7 of FIG. 6 rotated forty-five degrees illustrating the butterfly coils in the scanner.

In another embodiment of the scanner illustrated in FIGS. 6 and 7 resonant frequencies above 400 Hz are possible. The higher resonant frequency possible with this scanner are to a large extent a result of the higher field strengths possible by use of a large stationary magnet. This scanner includes a concave mirror 82 that carries a bearing boss 83 that receives a threaded fastener 84 extending through a plug 85 that clamps the inner periphery of a diaphragm 87 to the mirror. Plug 85 carries two butterfly connected coil pairs 88 and 89, 90 and 91. These four coils are bonded together and to the support plug 85.

The outer periphery of the diaphragm 87 is clamped between a retaining ring 92 and an annular core piece 94 by fasteners 96 which clamp the entire assembly to a frame member 97. An inner core piece 98 is clamped between the magnet 93 and the frame member 97 and has segmented arcuate lower ends 100, 101, 102 and 103 projecting within the coils 88 to 90, as shown in FIG. 7. A strong field is maintained between the core pieces 94 and 98 where the coil assembly is located. This field structure is similar to that used in conventional loud speakers. It differs however in that the inner pole piece 98 is partially split into four segments with the coil pairs being partly located in the split portions.

A current through coils 88 and 89 which are in series will cause a force on the circular wire segments in a direction perpendicular to the field in the air gap between the pole pieces. The coils 88 and 89 are so connected that the forces are in nearly opposing directions which causes a torque that tilts the mirror in a similar fashion as in the FIGS. 4 and 5 embodiment. Coils 90 and 91 are in quadrature positions with respect thereto and work in a similar fashion to tilt the mirror 83 in a perpendicular direction. The cavity surrounding the scanner shown in FIGS. 6 and 7 is filled with a damping oil or the gap 76 is filled with a magnetic damping fluid.

Figure 8:
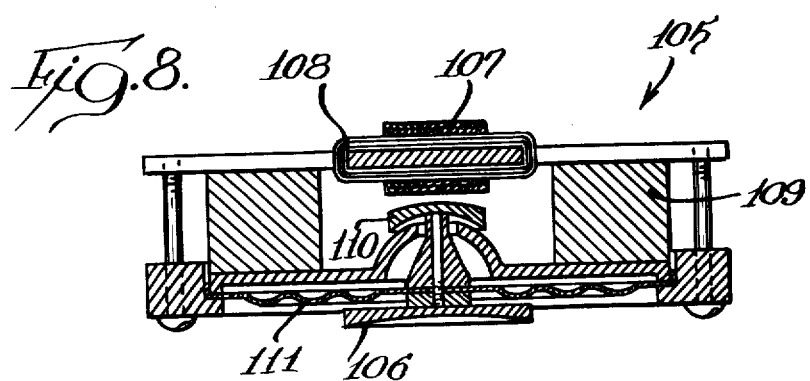
FIG. 8 is a cross-section of another embodiment of the optical scanner illustrated in FIGS. 4 and 5.

In FIG. 8 a still further alternative optical scanner 105 is illustrated having a moveable mirror 106 positioned by perpendicularly related stationary coils 107 and 108. A large stationary annular magnet 109 is provided which in conjunction with the coils 107 and 108 positions a permeable iron member 110 fixedly carried by mirror 106. Mirror 106 is supported by diaphragm 111 in a similar manner to the FIGS. 4 to 6 embodiments and this scanner operates in a similar fashion so that no further explanation is believed necessary.

In FIGS. 9 and 11 a partly schematic control circuit is provided for driving the y-servo 19, the x-servo 20 and the coils 68 and 72 in the scanner 28. Viewing FIG. 9, scan signals originate from a reference oscillator 115 which is a four-phase sine wave oscillator which produces sine waves of instantaneous amplitude R cos wt, R sin wt, −R sin wt, and −R cos wt. The amplitude R is most conveniently chosen in the range of five to twelve volts and represents the radius of the scan circle in the above equations. The coils 68 and 72 in the scanner head are fed from operational feedback amplifiers 116 and 117 respectively. Voltage feedback is provided in these amplifiers through variable resistors 118 and 119 to summing points 121 and 122.

The alternating signals impressed on coils 68 and 72 to provide the nutating motion of mirror 34 are provided from the sine/cosine oscillator 115 through a phase shifter 124. The phase shifter 124 is provided to compensate for the inductance of the scanner coils 68 and 72. In the phase shifter a variable resistor 126 and a capacitor 127 are connected to the cosine outputs of the sine/cosine oscillator 115 in a fashion such that the amplitude of the signal at point 128 remains constant. Resistor 126 controls the phase of the signal at point 128. The signal at point 128 is fed across an amplitude control resistor 130 to the summing points 121 and 122 across capacitor 131 and resistor 132 which maintain a ninety degree phase shift between the signals applied to the summing points from the phase shifter 124. In this manner, the phase shifter 124 applies the R cos wt to amplifier 116 and R sin wt to amplifier 117 where R is the radius of the scan circle.

At this point it should be recalled that the scanner coil signals generated by the control circuit of FIGS. 9 and 11 are defined by the equations $$S_x = (pV+q)\cos\alpha - rK\sin\alpha + R\cos(wt+\alpha)$$ and $$S_y = (pV+q)\sin\alpha + rK\cos\alpha + R\sin(wt+\alpha),$$

where p, q and r are constants, V = speed signal, R = radius of the scanning circle, forward offset FO = pV + q + R and kerf offset KO = rK.

If the scanner has a phase delay α between signal and position, the scan signals Sx and Sy, should be shifted by an angle α, which is obtained in the phase shifter 124.

The summing points 121 and 122 combine the periodic signals from the phase shifter 124 with slowly varying d.c. signals derived by modifying signals from a sine/cosine resolver 136 with a pulse width modulating circuit shown in schematic form in FIG. 11 to provide the kerf and forward offsets for the axis of nutation of the scan mirror 34. This combination of signals is defined by the above equations, for Sx and Sy which represent the inputs to the operational amplifiers 116 and 117. It should be noted that the angle α is the direction of motion with respect to the positive X direction, K is the value of the desired side offset that may be both positive or negative, and V is the value of the tangential speed signal.

Figure 10:
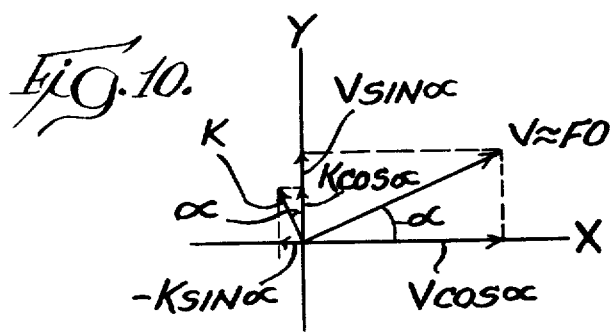
FIG. 10 is a vector diagram illustrating the servo drive signals and kerf offset signal.

As seen by the above equations for Sx and Sy and the vectors of FIG. 10, the term rK (side offset) is a vector of right angles to the forward offset vector (pV+q) and by allowing K to be either positive or negative such side offsets may be at either side of the path of travel of the machine and thus allow for left or right tool size compensation.

Viewing FIG. 9, the ±k sin α and ±k cos α terms are generated in a conventional electronic resolver 136 which receives R sin wt and R cos wt sine waves from oscillator 115 and processes control signals in line 139 from photocell 30 through signal processor 140. The electronic resolver 136 is conventional by itself and functions basically to select instantaneous values of the sine and cosine waves generated by oscillator 115 at time intervals determined by the processing signals in line 139. The signals in lines 142 and 143 are modulated by the speed control gates 146 and 147 to provide slowly varying d.c. signals V sin α and V cos α in lines 144 and 145 for driving the y-servo-motor 19 and the x-servo-motor 20.

The current signals Sx and Sy applied at the current ports 121 and 122 have directional or slowly varying d.c. components made up in voltage multipliers 146, 147, 148, 149, 150 and 151, which multiply panel preset values of speed V and side offset K with the direction vector signals from the resolver 136.

The signals in lines 144 and 145, i.e. V sin α and V cos α are also fed through current translating resistors 152 and 153 into the summing current ports 121 and 122 to represent part of the forward offset terms in the above Sx and Sy equations. The q cos α and q sin α are obtained through resistors 155 and 156 directly from the resolver 136 to complete the forward off-set terms in the equations. In this manner, the forward offset of the scan circle center is always proportional to speed signal V applied to the tracer drive servos 19 and 20 to increase and decrease forward offset with tracing speed.

The voltage multipliers 148, 149, 150 and 151 provide the kerf offset terms $-K \sin \alpha$ and $+K \cos \alpha$ to the summing points 121 and 122 in accordance with the above equations for Sx and Sy.

The multipliers 146, 147, 148, 149, 150 and 151 take the form of transmission gates which are switched on and off by square wave signals of variable duty cycle. The variable duty cycles represent speed V and side offset K. The square wave switching frequency is typically chosen high enough to be easily filtered out of amplifiers 116 and 117 and servo-drives 19 and 20, by filters (not shown) which do not influence servo behavior. The multipliers 148, 149, 150 and 151 are the kerf offset gates and are used in pairs to produce side offset signals to ports 121 and 122 respectively. Gates 149 and 150 are controlled by side offset square waves K, while gates 148 and 151 are controlled by the inverse of signal K labelled $\overline{K}$. If K is set to a fifty percent duty cycle then so is $\overline{K}$ and hence, the d.c. content of the signals from gate 149 and gate 150 cancel in port 121 for the zero offset condition. Similarly, the side offset signals in port 122 would also be cancelled under the same conditions. Thus, a side offset potentiometer 170 illustrated in FIG. 11, which sets the duty cycle of the side offset square wave signals, has its zero offset position midscale and has negative or positive control on either side of the center when the duty cycle is smaller or larger than fifty percent.

The constants p, q and r as set forth above, relate the voltage outputs from the gates 146, 147, 148, 149, 150 and 151 to the current inputs at summing points or port 121 and 122 and are determined by the suitable choice of the values of resistors 152, 153, 155 and 156 as well as resistors 158, 159, 160 and 161.

A pulse width modulator circuit is illustrated in FIG. 11 for developing the square wave variable duty cycle signals to provide the timing or control inputs for gates 146, 147, 148, 149, 150 and 151 illustrated in FIG. 9. Amplifiers 162, 163, 164 and 165 are operational amplifiers operating from +12 volts and −12 volts supplies. Amplifier 163 is an integrator producing a triangular waveform. The integrated voltage at 167 is inverted whenever the output voltage of the integrator 163 reaches +7.2 volts or −7.2 volts. At these times, switch 162 inverts the signal at 167 as a result of the input voltage to the switch 162 derived from the center of a divider 171 and 172, changing its polarity. Diodes 175 and 176 clamp the signal at 167 to the reference supply +7.2 volts and −7.2 volts, and the diodes 169 and 171 compensate for the voltage drops of diodes 175 and 176.

Amplifiers 164 and 165 are also comparison switches, comparing the voltages preset in potentiometer 178 that controls the speed duty cycle signal V and potentiometer 170 that controls the kerf duty cycle signal K and the inverted duty cycle gating signal to the triangular waveform at junction 182 from amplifier 163. Depending on the preset levels of potentiometers 170 and 178, switches 164 and 165 produce square waves having duty cycles proportional to the levels set. Inverter 184 provides the $\overline{K}$ signal for gates 148 and 151 while the uninverted signal 180 is the control input K to gates 149 and 150. The variable forward offset and speed control signal V illustrated in FIG. 11, is used to control gating in the multipliers 146 and 147 shown in FIG. 9.

Figure 12:
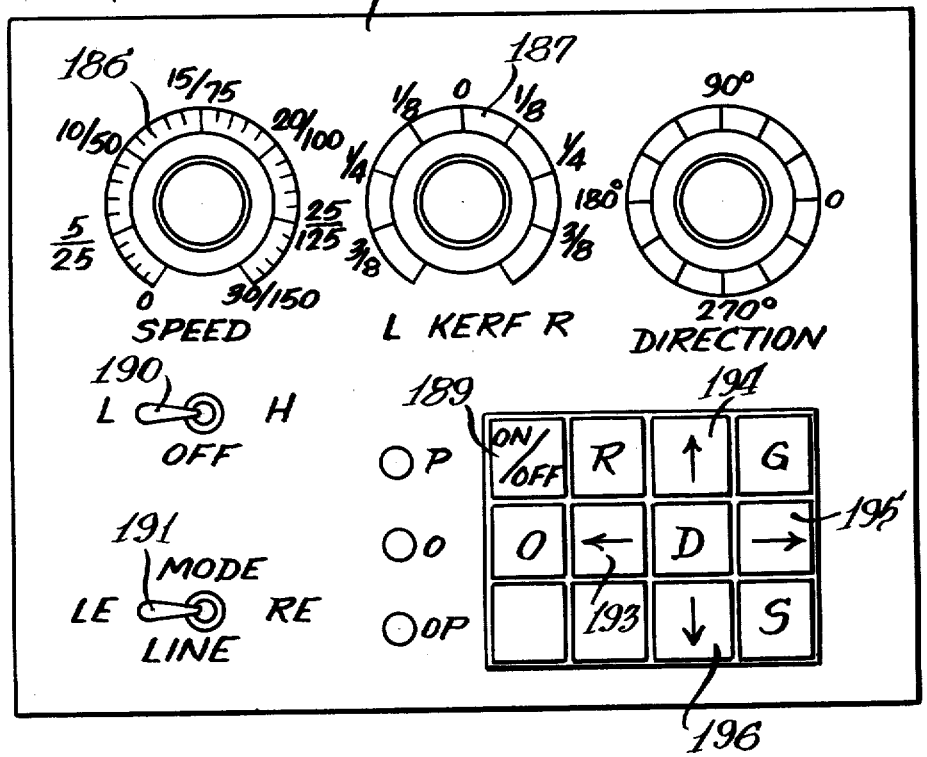
FIG. 12 is a front view of a control panel for the present optical tracing system.

A control panel 185 is illustrated in FIG. 12 that accomodates the remote control functions for the scanner shown in FIGS. 1 through 11. A speed control knob 186 controls potentiometer 178 in FIG. 11, and a kerf control knob 187 controls the positive or negative kerf obtained by movement of the potentiometer 170. The remaining controls on the panel 185 are self-explanatory.

In operation, after properly positioning the pattern 13 (31 in FIG. 2) beneath the tracing head 12 and locating a workpiece beneath the cutting tool 15, the operator presses power button 189 in a cluster of latch-hold buttons on the FIG. 12 control panel to activate line power to the system. A low or high speed range is selected by toggle switch 190 and the desired line portion traced is selected by toggle switch 191. The feed speed and forward offset is selected with knob 187. The initial direction of movement is selected from one of four direction buttons 193, 194, 195 and 196 so that the tracing head is driven toward the line or edge to be traced.

The pattern locating automatic "catching" circuit is not described in this application, so that the following description will continue with conditions existing after the scan image is properly positioned and traveling over the line to be traced. The circular scan circle on pattern 31 provided by the nutating mirror 34 provides signals from photocell 30 four times for each complete nutation, two at the leading edge of the scan circle as the image crosses the traced line and two at the trailing edge of the scan circle as the image again crosses the traced line. The center of the scan circle is offset from reference axis 35 in the direction of motion by an amount determined by the feed speed selected with knob 186, and also offset in a direction perpendicular to the direction of motion by an amount determined by the setting of knob 187.

The signal processor 140 blanks out the photocell signals from the trailing edge of the scan circle and utilizes the leading edge signals to develop timing signals in line 139. These timing signals are used in the electronic resolver 136 to derive drive signals for the x and y servos 19 and 20 as described above to maintain the photocell image over the pattern traveling at the selected speed.

If the operator desires an increase in tracing speed, he advances knob 186 causing the pulse width modulator of FIG. 11 to increase the input duty cycle at gates 146 and 147, increasing or multiplying the drive signals to the servos 19 and 20. At the same time the d.c. component of the drive signals for the scanner coils 68 and 72 is increased automatically increasing the forward offset of the center of the scan circle. The increase in the forward offset of the scan circle does not affect the radius of the scan circle which is varied only by changing the amplitude of the alternating signals in coils 68 and 72 by the variable resistor 130 in the phase shifter 124 or by the oscillator 115.

A change in kerf offset is effected when desired by selecting a different value on knob 187 and this also occurs without changing the radius of the scan circle, but unlike the forward offset it is independent of speed. Rotation of knob 187 causes a change in the duty cycle from amplifier 165 in the pulse width modulator of FIG. 11, changing the duration of gating at gates 148, 149, 150, and 151 in FIG. 9 and varying the d.c. component of the drive signals to coils 68 and 72 that are at right angles to the forward offset drive signals.

What is claimed is:

1. An optical pattern tracing system, comprising; a frame moveable about two coordinates, power operated means for moving the frame along said two coordinates, a non-rotatable tracing head mounted on the frame, an optical scanner in said tracing head including photosensitive means providing control signals for the power operated means, means for projecting a scan spot upon the pattern in a path about a predetermined scanning radius and about a scan axis, actuator means in the tracing head for moving the projecting means, and control means spaced from the tracing head for controlling the actuator means to shift the projecting means to offset the scan spot path with respect to a reference axis of the tracing head by angularly shifting the scan axis without varying the scanning radius.

2. An optical pattern tracing system, as defined in claim 1, wherein the projecting means includes a source of light illuminating the pattern, a reflective surface moveable about two perpendicular axes angularly related with respect to the plane of the pattern to be traced, first coil means for moving said reflective surface about one of said perpendicular axes, second coil means for moving said reflective surface about the other of said perpendicular axes, means for generating a first alternating signal for driving said first coil means to oscillate the reflective surface about said one axis, means for generating a second alternating signal for driving said second coil means to oscillate the reflective surface about said other axis to provide oscillating movement of the reflective surface about the scan axis.

3. An optical pattern tracing system, comprising; a frame moveable about two coordinates, power operated means for moving the frame along said two coordinates, a tracing head mounted on the frame, an optical scanner in said tracing head including photosensitive means providing control signals for the power operated means, means for projecting a scan spot in a path upon the pattern about a predetermined scanning radius and about a fixed reference axis, and means for shifting the projecting means to offset the scan spot path from the reference axis without varying the scanning radius, the projecting means including a source of light illuminating the pattern, a reflective surface moveable about two perpendicular axes angularly related with respect to the plane of the pattern to be traced, first coil means for moving said reflective surface about one of said perpendicular axes, second coil means for moving said reflective surface about the other of said perpendicular axes, means for generating a first alternating signal for driving said first coil means to oscillate the reflective surface about said one axis, and means for generating a second alternating signal for driving said second coil means to oscillate the reflective surface about said other axis to provide oscillating movement of the reflective surface about a scan axis, said means for shifting the projecting means to offset the scan spot path including means for generating d.c. biasing signals for the first and second coil means.

4. An optical pattern tracing system, as defined in claim 1, wherein said means for shifting the projecting means to offset the scan spot path includes first means for shifting the scan spot path in a direction perpendicular to the direction of movement of the tracing head without varying the radius of scan.

5. An optical pattern tracing system, comprising; a frame moveable about two coordinates, power operated means for moving the frame along said two coordinates, a tracing head mounted on the frame, an optical scanner in said tracing head including photosensitive means providing control signals for the power operated means, means for projecting a scan spot in a path upon the pattern about a predetermined scanning radius and about a fixed reference axis, means for shifting the projecting means to offset the scan spot path from the reference axis without varying the scanning radius, and means for generating a speed control signal for the power operated means, said means for shifting the scan spot path being responsive to the speed control signal so that the offset of the scan spot path is automatically varied as the speed of the tracing head is varied.

6. An optical pattern tracing system, comprising; a frame moveable about two coordinates, power operated means for moving the frame along said two coordinates, a tracing head mounted on the frame, an optical scanner in said tracing head including photosensitive means providing control signals for the power operated means, means for projecting a scan spot in a path on the pattern moveable about a reference axis in a scan area, means for shifting the projecting means to offset the scan area from the reference axis in the direction of movement of the tracing head, and means for generating variable speed control signals for the power operated means to control the speed of the tracing head, said means for shifting the projecting means to offset the scan area from the reference axis being continuously responsive to the speed control signals so that the offset of the scan spot path from the reference axis varies continuously with the speed of the tracing head.

7. An optical pattern tracing system, as defined in claim 6, wherein the means for projecting the scan spot in a path on the pattern includes an oscillating reflective surface for generating a generally circular scan area on the pattern about a scan axis, said means for shifting the projecting means to offset the scan area including means for shifting the scan axis with respect to the reference axis.

8. An optical pattern tracing system, comprising; a frame moveable about two coordinates, power operated means for moving the frame about said two coordinates, a tracing head mounted on the frame, an optical scanner in said scanning head including photosensitive means providing control signals for the power operated means, means for projecting a scan spot in an oscillating arcuate scan path on the pattern about a predetermined scan radius, actuator means in the tracing head for moving the projecting means, and control means for the actuator means for remotely shifting the scan path in a direction opposite the direction of movement of the tracing head during scanning without varying the radius of scan to reduce the effective forward offset of the scan path during slow speed travel of the tracing head.

9. An optical pattern tracing system, comprising; a frame moveable in two coordinate directions, first and second servo-motor means for driving the frame in said two coordinate directions, a tracing head fixedly mounted on the frame, an optical scanner in said tracing head including photosensitive means for providing control signals for the first and second servo-motor means, a reflective scanning element in said tracing head mounted for pure nutational movement without rotation about two perpendicular axes to project a moving scan spot in a path on the pattern, first coil means providing pivotal movement of the scanning element about one of said perpendicular axes, second coil means providing pivotal movement of the reflective element about the other of said perpendicular axes, and means for simultaneously energizing the first and second coil means to cause oscillating movement of the reflective element to produce an oscillating scan spot path on the pattern.

10. An optical pattern tracing system, comprising; a frame moveable in two coordinate directions, first and second servo-motor means for driving the frame in said two coordinate directions, a tracing head fixedly mounted on the frame, an optical scanner in said tracing head including photosensitive means for providing control signals for the first and second servo-motor means, a reflective scanning element in said tracing head mounted for pivotal movement about two perpendicular axes to project a scan spot in a path on the pattern, first coil means providing pivotal movement of the scanning element about one of said perpendicular axes, second coil means providing pivotal movement of the reflective element about the other of said perpendicular axes, and means for simultaneously energizing the first and second coil means to cause oscillating movement of the reflective element to produce an oscillating scan spot path on the pattern, the means for energizing the first and second coil means including means for initially energizing the first and second coil means to cause motion of said reflective element about a reference axis, said means for simultaneously energizing the first and second coil means including means to energize the first and second coil means to cause motion of said reflective element about a scan axis angularly related to the reference axis to produce either a side offset or a forward offset of the scan spot path with respect to the reference axis.

11. An optical pattern tracing system, as defined in claim 10, wherein the means for simultaneously energizing the first and second coil means includes means for generating an alternating signal for each of the first and second coil means and applying said signals to the coil means in out of phase relation, said means for simultaneously energizing said first and second coil means to cause rotation of said reflective element about an axis angularly related to the reference axis including means for deriving a first direct current signal for application to said first and second coil means to shift the axis of rotation of the reflective element in the direction of movement of the tracing head to achieve forward offset of the scan spot path.

12. An optical pattern tracing system, as defined in claim 11, including means for deriving a second direct current signal for application to said first and second coil means to shift the axis of rotation of the reflective element in a direction perpendicular to the direction of movement of the tracing head to produce side offset of the scan area with respect to the reference axis.

13. An optical pattern tracing system, as defined in claim 9, including a diaphragm supporting said reflective element for pivotal movement in all directions, a permanent magnet fixed to the reflective element, said first coil means being axially adjacent the end of the permanent magnet opposite the reflective element, said second coil means surrounding and being perpendicular to the first coil means.

14. An optical pattern tracing system, as defined in claim 9, including an annular large permanent magnet fixed in said tracing head adjacent and symmetrically positioned with respect to the reflective element, said first and second coil means including a plurality of coils having openings therethrough carried by the reflective element, and a plurality of fixed core members extending through the openings in the coils and engaging the large permanent magnet to provide a high frequency response for the reflective element.

15. An optical pattern tracing system, comprising; a frame moveable in two coordinates, power operated means for moving the frame along the two coordinates, a tracing head carried by the frame, an optical scanner in said tracing head including photosensitive means for providing control signals for the power operated means, a pivotally mounted reflective element for projecting a scan spot path on the pattern, and a source of light, said reflective element being mounted to project light from the source onto the pattern to facilitate location of the scan position on the pattern.

16. An optical pattern tracing system, as defined in claim 15, wherein said photosensitive means is mounted in the bottom of the tracing head, said reflective element being mounted adjacent the top of the tracing head, a frame member supporting and surrounding the photosensitive element permitting the passage of light therethrough, said light source being mounted adjacent said photosensitive element at the side thereof opposite the reflective element so that light passes through the frame member to the reflective element and is projected onto the pattern generally as an area of light to locate the scanning area.

17. An optical pattern tracer, comprising; a frame mounted for movement along two coordinates, a first servo-motor for moving the frame along one of the coordinates, a second servo-motor for moving the frame along the other of said coordinates, a tracing head non-rotatably mounted on the frame, an optical scanner mounted in the tracing head providing control signals for the first and second servo-motors including a photosensitive element, a pivotally mounted mirror in said tracing head for projecting a scan spot onto the pattern to be traced, means mounting the mirror for pure nutational motion without rotation, first coil means for pivotally moving the mirror in one plane, second coil means for pivotally moving the mirror in a plane perpendicular to said one plane, a sine/cosine resolver, said sine/cosine resolver being responsive to the photosensitive element for providing first drive signals for the first servo-motor and a second drive signal for the second servo-motor, means for generating and applying a first alternating signal to the first coil means, and means for generating and applying a second alternating signal to the second coil means to drive the mirror in pure nutation about a scan axis to provide a generally circular scan path on the pattern.

18. An optical pattern tracer, comprising; a frame mounted for movement along two coordinates, a first servo-motor for moving the frame along one of the coordinates, a second servo-motor for moving the frame along the other of said coordinates, a tracing head non-rotatably mounted on the frame, an optical scanner mounted in the tracing head providing control signals for the first and second servo-motors including a photosensitive element, a pivotally mounted mirror in said tracing head for projecting a scan spot onto the pattern to be traced, first coil means for pivotally moving the mirror in one plane, second coil means for pivotally moving the mirror in a plane perpendicular to said one plane, a sine/cosine resolver, said sine/cosine resolver being responsive to the photosensitive element for providing first drive signals for the first servo-motor and second drive signals for the second servo-motor, means for generating and applying a first alternating signal to the first coil means, means for generating and applying a second alternating signal out of phase with respect to the first alternating signal to the second coil means to drive the mirror in rotation about a scan axis to provide a generally circular scan path on the pattern, including means for generating and applying a first offset signal to at least one of said first and second coil means to shift the scan axis of the scan path in the direction of movement of the tracing head, and means for generating and applying a second offset signal to at least one of said first and second coil means to shift the scan axis of the scan path in a direction perpendicular to the direction of movement of the tracing head.

19. An optical pattern tracer, comprising; a frame mounted for movement along two coordinates, a first servo-motor for moving the frame along one of the coordinates, a second servo-motor for moving the frame along the other of said coordinates, a tracing head non-rotatably mounted on the frame, an optical scanner mounted in the tracing head providing control signals for the first and second servo-motors including a photosensitive element, a pivotally mounted mirror in said tracing head for projecting a scan spot onto the pattern to be traced, first coil means for pivotally moving the mirror in one plane, second coil means for pivotally moving the mirror in a plane perpendicular to said one plane, a sine/cosine resolver, said sine/cosine resolver being responsive to the photosensitive element for providing first drive signals for the first servo-motor and a second drive signal for the second servo-motor, means for generating and applying a first alternating signal to the first coil means, means for generating and applying a second alternating signal out of phase with respect to the first alternating signal to the second coil means to drive the mirror in rotation about a scan axis to provide a generally circular scan path on the pattern, means for generating and applying a first offset signal to at least one of said first and second coil means to shift the scan axis of the scan path in the direction of movement of the tracing head, and means for generating and applying a second offset signal to at least one of said first and second coil means to shift the scan axis of the scan path in a direction perpendicular to the direction of the movement of the tracing head, said first offset signal being phased ninety degrees with respect to the second offset signal.

20. An optical pattern tracer, comprising; a frame mounted for movement along two coordinates, power operated means for moving the frame along the two coordinates, an optical scanning assembly for scanning the pattern and providing control signals for the power operated means, said scanning assembly including an optical deflector having pure nutating motion without rotation for projecting a scan spot in a circular path on the pattern.

21. An optical pattern tracing system, comprising; a frame moveable about two coordinates, power operated means for moving the frame along said two coordinates, a non-rotatable tracing head mounted on the frame, an optical scanner in said tracing head including photosensitive means providing control signals for the power operated means, means for projecting a scan spot in a path upon the pattern a predetermined distance from and about a scan axis, and means for shifting the projecting means during scanning to offset the scan spot path and the scan axis with respect to a reference axis of the tracing head without changing the distance between the scan spot path and the scan axis.

22. An optical pattern tracing system, comprising; a frame moveable about two coordinates, power operated means for moving the frame along said two coordinates, a tracing head mounted on the frame, an optical scanner in said tracing head having an optical axis including photosensitive means providing control signals for the power operated means, means for projecting a scan spot in a path upon the pattern, and a lens in the tracing head having a focal plane containing the projecting means for passing light rays from the projecting means parallel to the optical axis so that variations in the tracing head to pattern distance do not affect the accuracy of the system.

23. An optical pattern tracing system, as defined in claim 22, wherein the geometric axis of said lens is tilted with respect to the reference axis of the tracing head, to prevent reflections on the lens surfaces from disturbing the photocell signal.

24. In an optical pattern tracing system of the type having a frame moveable about two coordinates, with power operated means for moving the frame along the two coordinates, a non-rotatable tracing head and control system comprising; an optical scanner in the tracing head including photosensitive means providing control signals for the power operated means, means for projecting a moving scan spot in a path upon the pattern a predetermined distance from a fixed reference in the tracing head, actuator means in the tracing head for moving the projecting means, and control means spaced from the tracing head for the actuator means for shifting the projecting means to offset the scan spot path from the reference axis without varying the size and shape of the scan path.

* * * * *